United States Patent
Fukuda et al.

(10) Patent No.: US 12,118,410 B2
(45) Date of Patent: *Oct. 15, 2024

(54) DELETION OF EVENTS BASED ON A PLURALITY OF FACTORS IN A CONNECTED CAR COMPUTING ENVIRONMENT

(71) Applicant: International Business Machines Corporation, Armonk, NY (US)

(72) Inventors: Mari A. Fukuda, Tokyo (JP); Yuhko K. Hasegawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,127

(22) Filed: May 19, 2021

(65) Prior Publication Data
US 2021/0271534 A1 Sep. 2, 2021

Related U.S. Application Data

(63) Continuation of application No. 16/379,705, filed on Apr. 9, 2019, now Pat. No. 11,030,019.

(51) Int. Cl.
  *G06F 3/00* (2006.01)
  *G06F 9/54* (2006.01)
  (Continued)

(52) U.S. Cl.
  CPC .......... *G06F 9/542* (2013.01); *G06F 16/9035* (2019.01); *G06F 16/909* (2019.01); *G08G 1/20* (2013.01)

(58) Field of Classification Search
  CPC ........................................................ G06F 9/54
  See application file for complete search history.

(56) References Cited

U.S. PATENT DOCUMENTS 9,460,616 B1  10/2016  Miyahira et al.
9,558,196 B2   1/2017  Johnston et al.
(Continued)

FOREIGN PATENT DOCUMENTS

CN       1665288 A    9/2005
CN     102959589 A    3/2013
(Continued)

OTHER PUBLICATIONS

Minglu Li, Ants: Efficient Vehicle Locating Based on Ant Search in ShanghaiGrid. (Year: 2009).*

(Continued)

*Primary Examiner* — Lechi Truong
(74) *Attorney, Agent, or Firm* — KONRAD, RAYNES, DAVDA & VICTOR LLP; Rabindranath Dutta

(57) ABSTRACT

A computational device maintains indications of a plurality of events associated with navigation of a plurality of vehicles in a geographical area. A determination is made as to whether to delete an event from the plurality of events, by performing: transmitting, by an event deletion manager, a query to a plurality of deletion determination agents on whether to delete the event; receiving, by the event deletion manager, an indication from the plurality of deletion determination agents whether to delete the event; and aggregating, by the event deletion manager, indications received from the plurality of deletion determination agents to determine whether to delete the event.

8 Claims, 11 Drawing Sheets

(51) Int. Cl.
　　*G06F 16/9035*　　(2019.01)
　　*G06F 16/909*　　(2019.01)
　　*G08G 1/00*　　(2006.01)

(56) References Cited

U.S. PATENT DOCUMENTS

| | | | |
|---|---|---|---|
| 9,894,100 | B2 | 2/2018 | Pernicha |
| 10,725,761 | B2* | 7/2020 | Crane ..................... H04L 67/60 |
| 2003/0047387 | A1* | 3/2003 | Bogat ..................... A47F 9/047 |
| | | | 186/59 |
| 2008/0010136 | A1* | 1/2008 | Yu ......................... G06Q 30/00 |
| | | | 705/342 |
| 2009/0070869 | A1* | 3/2009 | Fan ........................ G06F 21/51 |
| | | | 726/22 |
| 2010/0145995 | A1* | 6/2010 | Cameron .............. G06F 3/0623 |
| | | | 707/E17.005 |
| 2011/0060496 | A1 | 3/2011 | Nielsen et al. |
| 2015/0085691 | A1* | 3/2015 | Custer ................... H04L 41/145 |
| | | | 370/252 |
| 2015/0211870 | A1* | 7/2015 | Nickolaou ............. G01C 21/34 |
| | | | 701/28 |
| 2016/0127306 | A1* | 5/2016 | Wang .................. H04L 61/4541 |
| | | | 370/390 |
| 2016/0140196 | A1* | 5/2016 | Kobayashi ............ G06F 16/258 |
| | | | 707/693 |
| 2016/0299799 | A1* | 10/2016 | De Smet .......... G06F 16/24534 |
| 2017/0010112 | A1 | 1/2017 | Gotoh et al. |
| 2017/0052976 | A1* | 2/2017 | Verma ............... G06F 16/24552 |
| 2017/0161388 | A1* | 6/2017 | Aziz .................... G06Q 10/109 |
| 2018/0210729 | A1 | 7/2018 | Bender et al. |
| 2019/0277640 | A1 | 9/2019 | Nelapati et al. |
| 2020/0250210 | A1* | 8/2020 | Busjaeger ............. G06F 16/162 |
| 2020/0326995 | A1 | 10/2020 | Fukuda et al. |
| 2023/0153446 | A1* | 5/2023 | England ................ G06F 21/604 |
| | | | 726/27 |
| 2023/0401274 | A1* | 12/2023 | Denninghoff ...... G06Q 30/0251 |

FOREIGN PATENT DOCUMENTS

| | | | |
|---|---|---|---|
| CN | 103988199 | A | 8/2014 |
| CN | 104809901 | A | 7/2015 |
| CN | 105940412 | A | 9/2016 |
| DE | 112014003653 | T5 | 4/2016 |
| KR | 20160108421 | A * | 9/2006 |

OTHER PUBLICATIONS

Jie Yang, Predicting Next Location Using a Variable Order Markov Model . (Year: 2014).*

Ricardo Hoar, Visualizing Transit Through a Web Based Geographic Information System. (Year: 2008).*

Alan Demers, Cayuga: A General Purpose Event Monitoring System, (Year: 2007).*

Cheqing Jin, Dynamically Maintaining Frequent Items Over A Data Stream. (Year: 2003).*

Satoshi Horai, Intraspecific Nucleotide Sequence Differences in the Major Noncoding Region of Human Mitochondrial DNA. (Year: 1990).*

Gábor Szárnyas, IncQuery-D: A Distributed Incremental Model Query Framework in the Cloud. (Year: 2010).*

Abe, M., et al., "IoT Context Descriptor: Situation Detection and Action Invocation Model for Real-time High-volume Transactions", 2018 IEEE International Congress on Internet of Things (ICIOT), Jul. 2018, 4 pp.

Brownlee, J., "A Gentle Introduction to Exponential Smoothing for Time Series Forecasting in Python", [online], Aug. 20, 2018, [Retrieved on Mar. 20, 2019], Retrieved from the Internet at <URL: https://machinelearningmastery.com/exponential-smoothing-for-time-series-forecasting-in-python/>, 16 pp.

Gruteser, M., et al., "Anonymous Usage of Location-Based Services Through Spatial and Temporal Cloaking", (Year: 2003), Proceedings of the MobiSys 2003: The First International Conference on Mobile Systems, Applications, and Services, 13 pp.

Honda, "Safety Map", [online], [Retrieved on Apr. 9, 2019], Retrieved from the Internet at <URL: https://www.honda.co.jp/safetymap/>, 6 pp. [w/ Machine Translation].

IBM, "Product Overview and Features", [Retrieved on Aug. 22, 2018], Total 2 pp.

IBM Corporation, "IBM IoT Connected Vehicle Insights", [online], [Retrieved on Apr. 9, 2019], Retrieved from the Internet at <URL: https://www.ibm.com/us-en/marketplace/iot-for-automotive/details>, 4 pp.

Papamarkos, G., "Event-Condition-Action Rule Languages for the Semantic Web", (Year: 2003).

Office Action 1 for U.S. Appl. No. 16/379,705, dated Apr. 29, 2020, 17 pp. [57.438 (OA1)].

Response to Office Action 1 for U.S. Appl. No. 16/379,705, dated Jul. 29, 2020, 12 pp. [57.438 (ROA1)].

Final Office Action 1 for U.S. Appl. No. 16/379,705, dated Oct. 19, 2020, 13 pp. [57.438 (FOA1)].

Response to Final Office Action 1 for U.S. Appl. No. 16/379,705, dated Jan. 19, 2021, 12 pp. [57.438 (RFOA1)].

Notice of Allowance 1 for U.S. Appl. No. 16/379,705, dated Feb. 4, 2021, 9 pp. [57.438 (NOA1)].

List of IBM Patents or Patent Applications Treated as Related, May 19, 2021, 2 pp. [57.438C1 (Appendix P)].

Chinese Office Action dated Feb. 7, 2024, 7 pp., for Application No. CN202010275552.9.

Chinese Office Action dated Aug. 17, 2024, 7 pp. , for Application No. CN202010275552.9.

* cited by examiner

FIG. 3

| Event generation and deletion 300 | | | |
|---|---|---|---|
| | (Type-1) By declaration 304 | (Type-2) By delegation 306 | (Type-3) By time decay model 308 |
| Generation 302 | Events are generated by generation rule 310<br>• If<br>  • CarProbe.ABS is activated<br>  • from 3 different vehicles<br>  • within 15 minutes<br>  • AND Temperature is less than 0 degree<br>• then<br>  • GENERATE a slippery road event | Events are generated by human reports 312 | Planned events are generated with duration or with time decay model with a threshold of confidence 314 |
| Deletion 303 | Events are deleted by deletion rule 316<br>• If<br>  • CarProbe.ABS is not activated<br>  • from 3 different vehicles<br>  • AND within 15 minutes<br>  • OR Temperature is greater than 0 degree<br>• then<br>  • DELETE a slippery road event 318 | Events are deleted by delegating confirmation action to the cars approaching to the event 320 | Events are deleted by the planned schedule/duration. The time decay model may be predefined by each type of event or derived from the machine learning such as exponential smoothing for time series data 322<br><br>[graph: confidence vs Time, Delete 324] | ns
DELETION OF EVENTS BASED ON A PLURALITY OF FACTORS IN A CONNECTED CAR COMPUTING ENVIRONMENT

This application is a continuation of U.S. patent application Ser. No. 16/379,705, filed Apr. 9, 2019, now U.S. patent Ser. No. 11/030,019 which application is incorporated herein by reference in its entirety.

BACKGROUND

1. Field

Embodiments relate to the deletion of events based on a plurality of factors in a connected car computing environment.

2. Background

Internet of Things (IoT) may be described as a network of devices that have software and hardware used to communicate with each other. In certain situations, the IoT devices may comprise network connected cars in a cloud computing environment. In certain IoT environments, a cloud node (e.g., a computational device) collects data from IoT devices and processes the data. The cloud node may also control certain operations of the IoT devices.

IoT based connected car software may support autonomous driving capabilities. Using this real-time infrastructure platform, optimization may be performed of driver journey and management may be performed of fleet operations. The behavior of drivers may also be monitored.

By viewing information provided by the connected car software throughout a vehicle's life, automotive engineers and service technicians may improve the vehicle's capabilities and avoid quality issues and recalls. They may monitor vehicle usage, fuel consumption, security and other in-car activities, and anticipate vehicle or device failures to reduce maintenance. The connected car software may provide drivers with up-to-date data that adds context and situational awareness, and may provide engineers with a deeper insight into vehicle movement and driving behavior.

The connected car software may analyze data from vehicle sensors at a granular level with the surrounding contextual and environmental information to provide situational detection. This enables vehicle-to-vehicle communication through the cloud. In addition, the connected car software may detect dangerous driving, including speeding, drifting, harsh accelerating or braking and fatigued driving to make adjustments that help keep drivers safer. This connected car software may use analytic insights in real time to improve the driving experience, prevent problems and reduce costs.

US2018/0210729A1 discusses dynamically deleting instructions generated by IoT devices based on parameters of the IoT device, state of the IoT device, state of a second IoT device or other computing resource in communication with the IoT. U.S. Pat. No. 9,558,196B2 discusses mechanisms for automatically deleting events from a system event log based on timestamp associated with each event node and indicating a last usage of the event using a last use indicator to free up memory space. DE112014003653T5 discusses automatically deleting instructions generated for a user's request upon communication with a digital assistant and storing the instructions as a runtime event to delete the instruction after a specific time. U.S. Pat. No. 9,894,100B2 discusses dynamically deleting a sub-set of policy rules of the updated set of policy rules based on weights assigned to types of traffic, preference settings, priority settings, network traffic characteristics and usage statistics for each policy rule.

SUMMARY OF THE PREFERRED EMBODIMENTS

Provided are a method, system, and computer program product in which a computational device maintains indications of a plurality of events associated with navigation of a plurality of vehicles in a geographical area. A determination is made as to whether to delete an event from the plurality of events, by performing: transmitting, by an event deletion manager, a query to a plurality of deletion determination agents on whether to delete the event; receiving, by the event deletion manager, an indication from the plurality of deletion determination agents whether to delete the event; and aggregating, by the event deletion manager, indications received from the plurality of deletion determination agents to determine whether to delete the event. As a result, events are deleted when they are no longer of relevance for the navigation of vehicles in the geographical area.

In certain embodiments, the event is deleted from the plurality of events in response to determining by the event deletion manager that a majority of deletion determination agents have indicated that the event is to be deleted. As a result, a majority voting based scheme is used to determine whether to delete events.

In further embodiments, the event is deleted from the plurality of events in response to determining by the event deletion manager that more than a predetermined threshold percentage of deletion determination agents have indicated that the event is to be deleted. As a result, for certain critical events (e.g., events that have a high chance of causing accidents) a supermajority approval may be needed to delete events.

In additional embodiments, the indication received by the event deletion manager from the plurality of deletion determination agents is one of: an indication to delete the event; an indication to not delete the event; and an indication that a determination cannot be made on whether to delete or not delete the event. As a result, the event deletion manager may determine which of the deletion determination agents need more time to determine whether or not to delete the event.

In further embodiments, in response to receiving by the event deletion manager, the indication from one or more selected deletion determination agents that a determination cannot be made on whether to delete or not delete the event, the event deletion manager calculates an earliest decision time for the one or more selected deletion determination agents and requests the one or more selected deletion determination agents to provide indication on whether to delete the event by applying a relaxed criteria for deleting the event. As a result, a limited amount of additional time is provided to certain deletion determination agents to determine whether or not a delete the event based on a relaxed deletion criteria, wherein the relaxed criteria makes it more likely to allow determination of whether or not to indicate deletion of events in comparison to a previously applied criteria.

In additional embodiments, the event deletion manager receives indications from the one or more selected deletion determination agents based on the relaxed criteria, on whether or not to delete the event. A determination is made as to whether to delete the event based on indications received from the plurality of deletion determination agents.

In further embodiments, the computational device and the plurality of vehicles are included in a cloud computing environment. As a result, the computational device may provide cloud computing services for vehicle navigation.

BRIEF DESCRIPTION OF THE DRAWINGS

Referring now to the drawings in which like reference numbers represent corresponding parts throughout:

FIG. 3 illustrates a block diagram that shows generation and deletion of events, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

In a connected car computing environment, events that indicate hazards such as accidents, obstacles, waterlogging (e.g., flooding), congestion, etc., may be placed on maps of geographical area. The events may be generated by humans, systems, or devices. The events are also generated by a rule-based approach or via other mechanisms that include the probing of operations of cars.

Events may be deleted by manual operation, or heuristics logic developed by solution designers. Solution designers are aware of the condition of event generation. However, not much attention is paid to the conditions of event deletion. Consequently, a lot of events may remain on data stores or system cache on memory in spite of the fact that the events are no longer of relevance in a connected car environment.

Certain embodiments provide mechanisms for automatically deleting events generated via Internet of Things (IoT) devices (e.g., connected cars), based on a majority or supermajority of decisions received from different deletion methods. Different deletion methods such as those based on deletion rules, delegation confirmations, and planned schedule or duration are used to generate multiple results, and based on the results a determination is made as to whether or not to delete an event. Calculations are made of a decision time within which a decision is to be made by a deletion method based on a relaxed criteria for deletion of events. As a result, improvements are made in the operations of IoT devices such as cars, and of computational devices that manage such IoT devices.

Exemplary Embodiments

Figure 1:
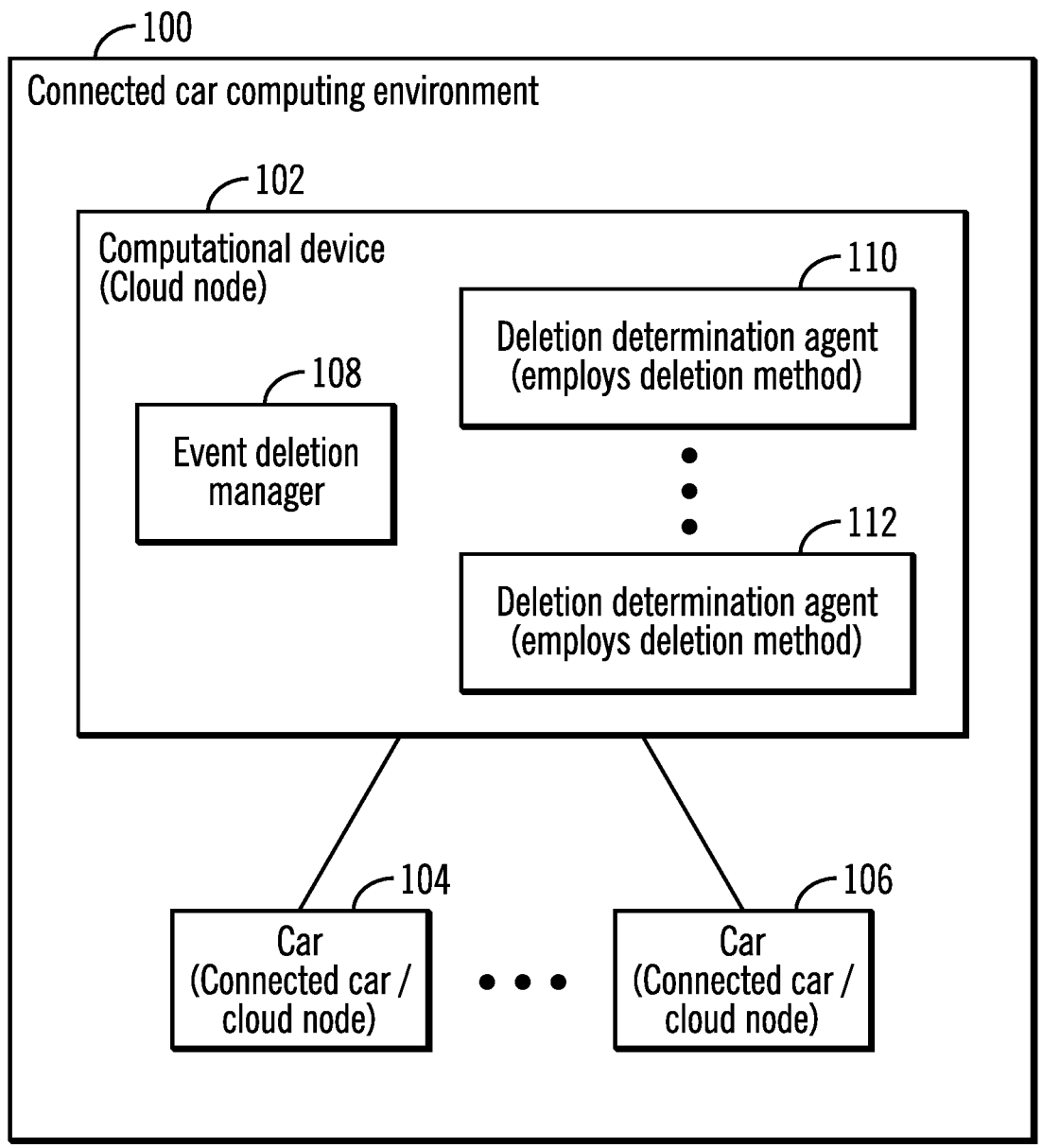
FIG. 1 illustrates a block diagram of a connected car computing environment comprising a computational device that is in communication with a plurality of cars in a geographical area, in accordance with certain embodiments.

FIG. 1 illustrates a block diagram of a connected car computing environment 100 comprising a computational device 102 that is in communication with a plurality of cars or other vehicles 104 in a geographical area, in accordance with certain embodiments.

The computational device 102 may be referred to a cloud node and may comprise any suitable computational device including those presently known in the art, such as, a personal computer, a workstation, a server, a mainframe, a hand held computer, a palm top computer, a telephony device, a network appliance, a blade computer, a processing device, a controller, etc.

The computational device 102 and the connected cars or vehicles 104, 106 may be elements in any suitable network, such as, a storage area network, a wide area network, the Internet, an intranet. In certain embodiments, the computational device 102 and the connected cars or vehicles 104, 106 may be elements in a cloud computing environment. The computational device 102 and the connected cars or vehicles 104, 106 may be referred to as cloud nodes of the cloud computing environment. The communication among the computational device 102 and the connected cards or vehicles 104, 106 may be over a cellular, Wi-Fi, or another type of communication protocol.

The cars 104, 106 may generate events that are analyzed by the computational device 102 and placed on a map of a geographical area. The computational device 102 may include an event deletion manager 108 and a plurality of deletion determination agents 110, 112 where each of the deletion determination agents 110, 112 employ different method to determine whether a deletion of an event is warranted. In certain embodiments, the event deletion manager 108 and the deletion determination agents 110, 112 are implemented in software, hardware, firmware of any combination thereof.

Figure 2:
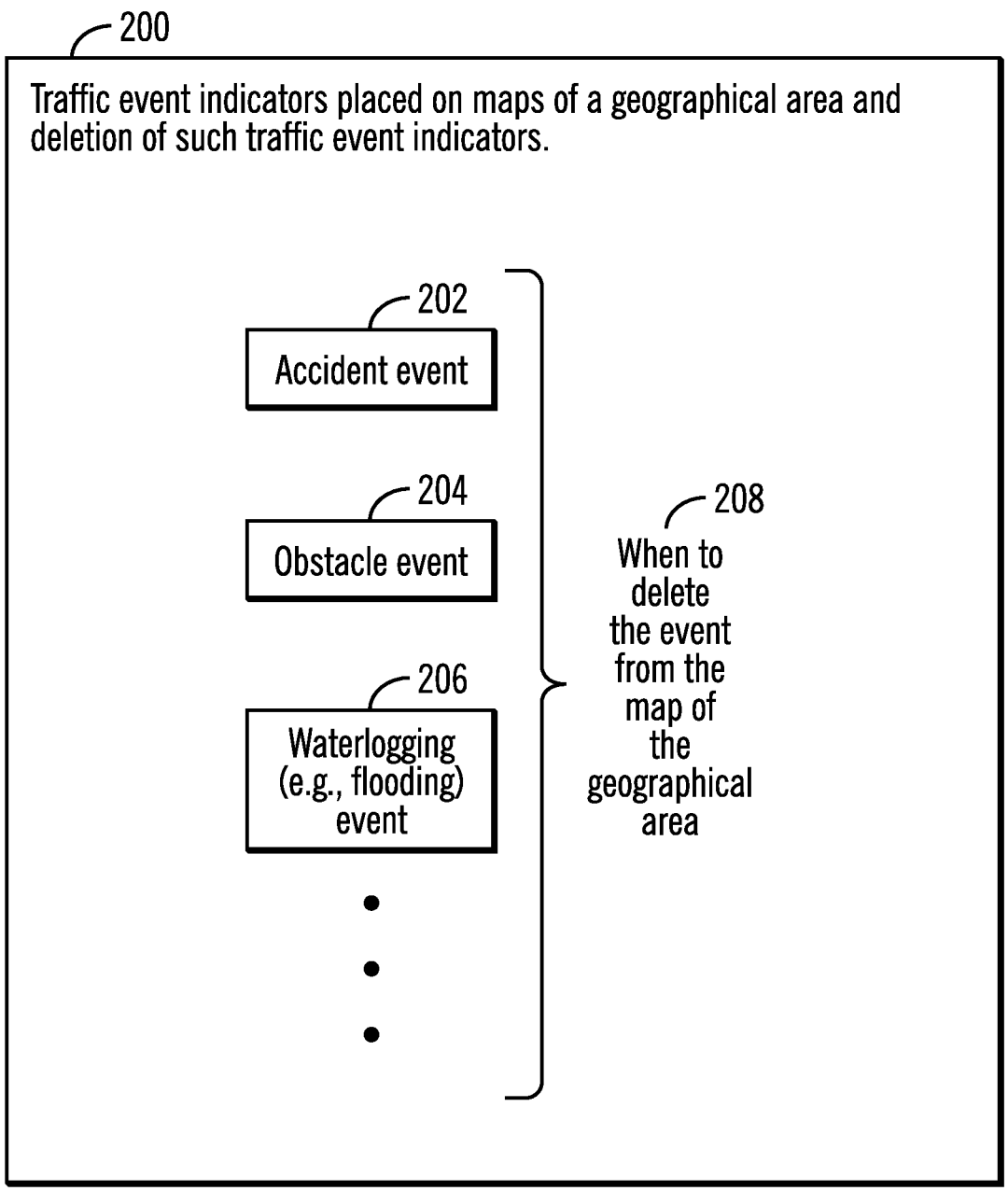
FIG. 2 illustrates a block diagram that shows traffic events indicators placed on maps of a geographical area and deletion of such traffic event indicators, in accordance with certain embodiments.

FIG. 2 illustrates a block diagram 200 that shows traffic events indicators placed on maps of a geographical area and deletion of such traffic event indicators, in accordance with certain embodiments. Exemplary traffic event indicator such as an accident event 202 that indicates the location of an accident in the map, an obstacle event 204 that shows an obstacle such as a traffic cone in a location in the map, a waterlogging event 206 that shows waterlogged condition (e.g., flooding) in a location in the map, etc., may be determined and placed in maps of a geographical area.

Certain embodiments, provide mechanisms to determine when to delete the events from the map of the geographical region (as shown via reference numeral 208).

FIG. 3 illustrates a block diagram 300 that shows generation 302 and deletion 303 of events, in accordance with certain embodiments.

In certain embodiments, events may be generation by declaration 304, by delegation 306, or via a time decay model 308. An exemplary slippery road event that indicates a slippery road at a geographical location is shown as being generated by declaration (via reference numeral 310) based on the Anti-lock Braking System (ABS) being activated in a plurality of vehicles within a duration of time at certain temperature ranges. Delegation based events are generated by human reports such as reports made by drivers (as shown via reference numeral 312). Events based on time decay model may be generated with a duration or with a time decay model along with a threshold of confidence (as shown via reference numeral 314). For example, an event may be generated with a validity period of 10 minutes. In another example, an event is likely to be valid with a high confidence limit for 10 minutes, but is likely to valid with a low confidence limit for 20 minutes based on a time decay model.

In certain embodiments, events may be deleted by a deletion rule as shown via reference numeral 316. For example, the slippery road event (generated as shown via reference numeral 310) may be deleted if Anti-lock Braking System (ABS) is not activated from a certain number of vehicles within a certain period of time or the temperature is greater than a certain predetermined temperature (as shown via reference numeral 318).

Delegation based generated events may be deleted by delegating confirmation action to cars approaching the event. For example, if a car approaches an accident site and the accident is no longer affecting traffic, an automated camera or the driver of the car may report that a corresponding accident event may be deleted (as shown via reference numeral 320).

Events based on the time decay model may be deleted in accordance with the planned schedule or duration (as shown via reference numerals, 322, 324). For example, the deletion may take place after a certain predetermined period of time or at a certain confidence level for deletion (as shown via reference numeral 324). The time decay model may be predefined by each type of event or derived from machine learning mechanisms that include exponential smoothing for time series data, where exponential smoothing is a time series forecasting method for univariate data that may be extended to support data with a systematic trend. In exponential smoothing forecasting methods a prediction is a weighted sum of past observations, but the model explicitly uses an exponentially decreasing weight for past observations.

Figure 4:
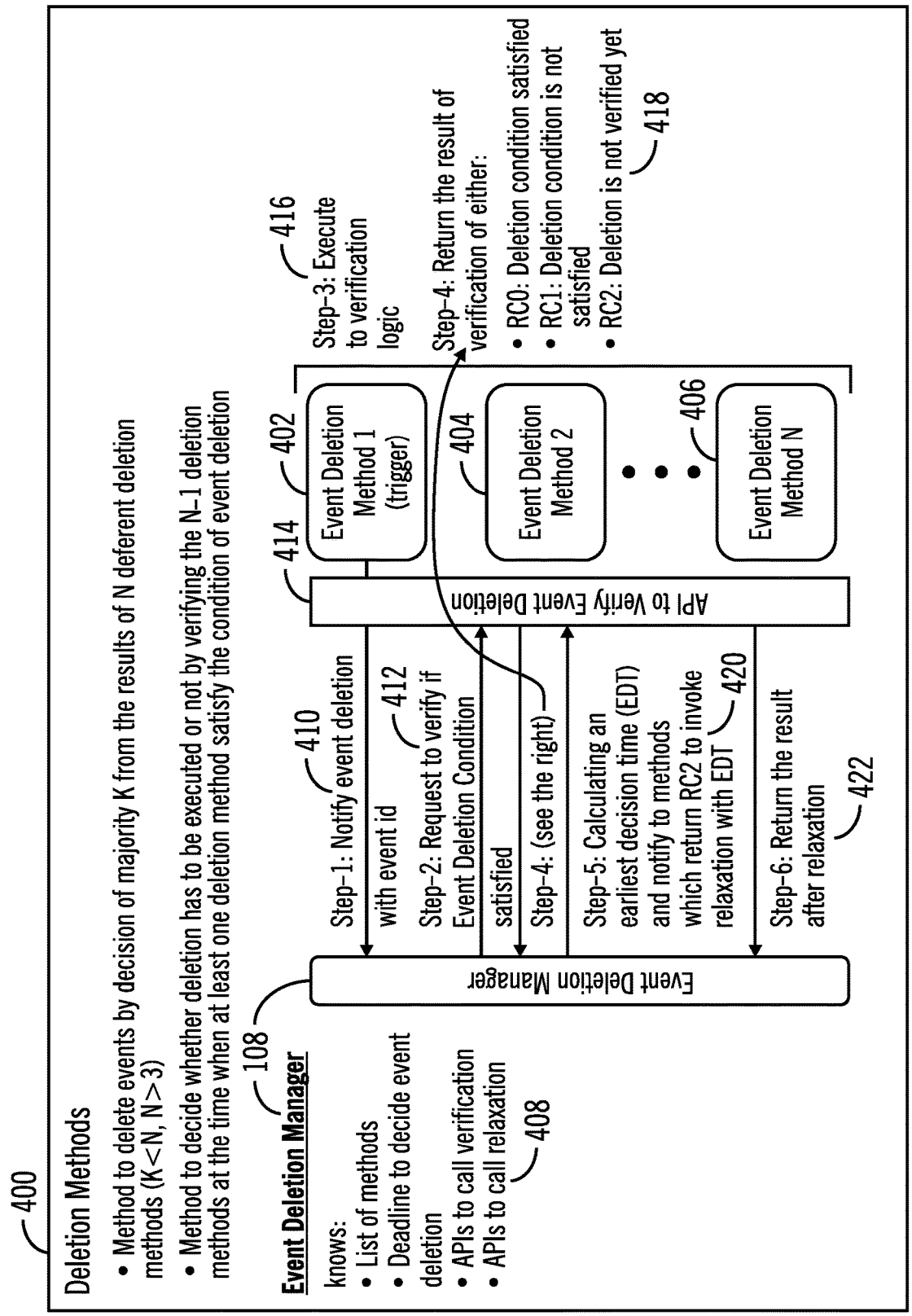
FIG. 4 illustrates a block diagram that shows how an event deletion manager deletes events, in accordance with certain embodiments.

FIG. 4 illustrates a block diagram 400 that shows how an event deletion manager 108 that executes in the computational device 102 deletes events based on event deletion methods 402, 404, 406, in accordance with certain embodiments. Each of the event deletion methods 402, 404, 406 are performed by a deletion determination agent 110, 112 that executes in the computational device 102.

The event deletion manager 108 is aware of the list of event deletion methods, the deadline to decide deletion of an event, and may call Application Programming Interfaces (API) to call verification logic and relaxation of criteria for determining deletion of events (as shown via reference numeral 408).

The event deletion manager 108 is notified of a potential for event deletion (reference numeral 410) that is triggered by event deletion method 402. The event deletion manager 108 then calls the API for verification of the event deletion (as shown via reference numerals 412, 414).

Once the API to verify event detection is called, verification logic is executed to determine whether to delete the event based on whether a majority of the event deletion methods 402, 404, 406 vote for deletion of the event (as shown via reference numeral 416).

The result of the verification of the event deletion from each of methods 402, 404, 406 may be one of the following (as shown via reference numeral 418):

1. Deletion condition satisfied (condition RC0);
2. Deletion condition is not satisfied (condition RC1); and
3. Deletion is not verified yet (condition RC2).

Since certain methods 402, 404, 406 are unable to determine whether or not to delete an event (condition RC2), the event deletion manager 108 calculates an earliest decision time (EDT) and sends a notification to methods which have been unable to determine whether or not to delete an event (condition RC2) to apply a relaxed criteria (i.e., a less stringent criteria for deletion than a deletion criteria employed earlier) for determining deletion (shown via reference numeral 420). The results are returned to the event deletion manager 108 after employing the relaxed criteria (as shown via reference numeral 422), and based on a majority voting of the event deletion methods a determination is made by the event deletion manager 108 whether or not to delete the event.

Therefore, FIG. 4 illustrates certain embodiments in which the event deletion manager 108 confirms whether or not to delete an event based on decisions on deletion made by a plurality of event deletion methods. In some cases a majority of event deletion methods have to confirm that an event has to be deleted before the event deletion manager 108 deletes the event. Certain events (e.g., an event that is likely to cause a severe accident) may be deleted when a supermajority of event deletion methods 402 confirm the deletion, where the supermajority may be two-thirds or more in certain embodiments.

The criteria for determining deletion is made less stringent when certain event deletion methods are unable to determine whether or not to confirm deletion and a decision time for making the determination is provided to the event deletion methods.

Figure 5:
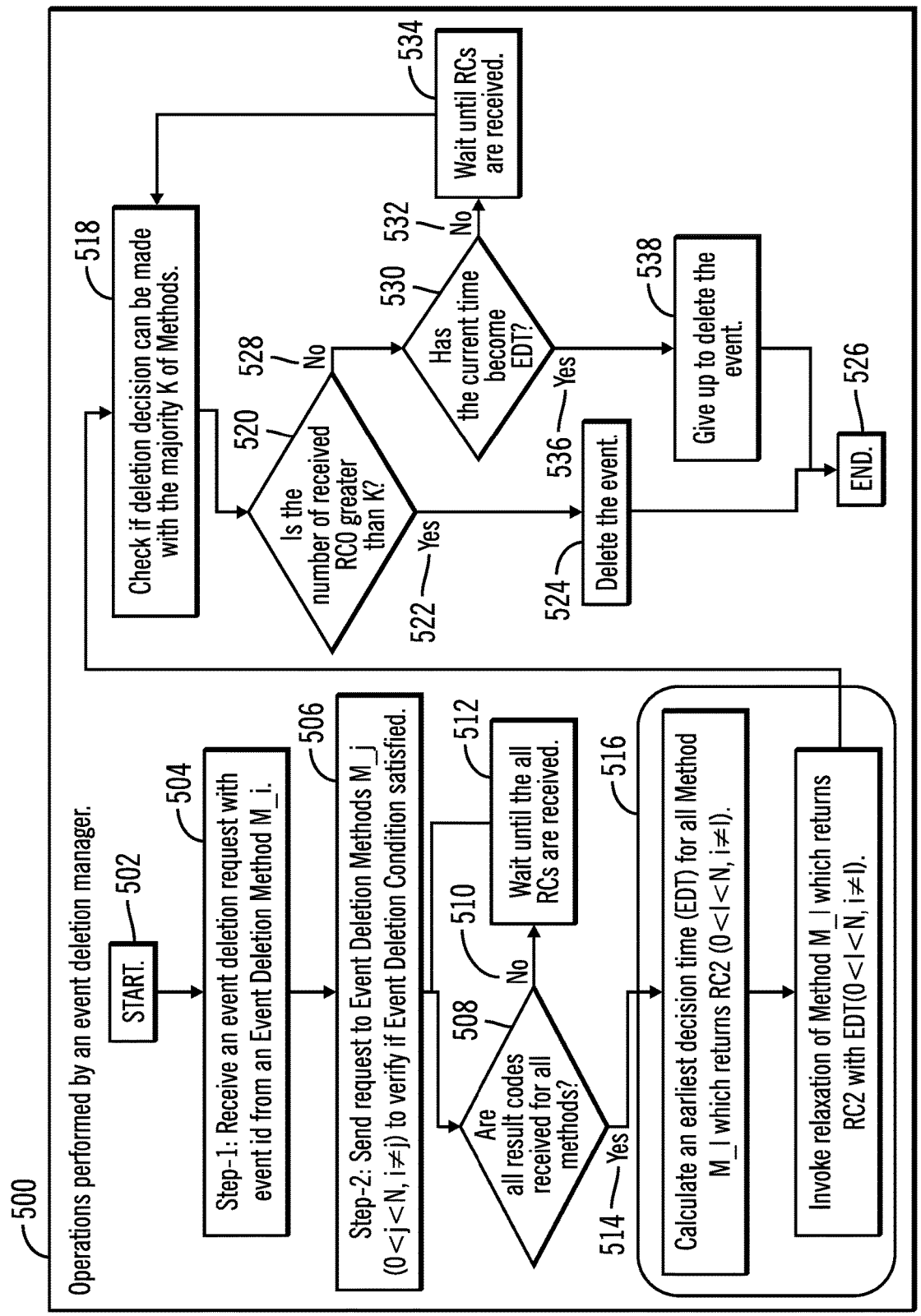
FIG. 5 illustrates a flow chart of operations performed by an event deletion manager, in accordance with certain embodiments.

FIG. 5 illustrates a flow chart 500 of operations performed by an event deletion manager 108, in accordance with certain embodiments.

Control starts at block 502, and proceeds to block 504 in which the event deletion manager 108 receives an event deletion request with an event identifier from an event deletion method M_i. The event deletion manager 108 sends (at block 506) a request to all other event deletion methods except for event deletion method M_i to verify whether the event deletion condition is satisfied for the event.

Control proceeds to block 508 where the event deletion manager 108 determines whether all result codes have received for all methods (the result codes being RC0, RC1, RC2 as shown in FIG. 4 reference numeral 418, where RC2 indicates that no determination can be made as to whether to delete or not delete the event). If not ("no" branch 510), the event deletion manager 108 waits (at block 512) until all the result codes are received. If all result codes are received ("yes" branch 514) control proceeds to blocks 516 in which an earliest decision time is determined for all methods that return the result code of RC2 indicating that no decision can be made on whether or not to delete an event, and a relaxed criteria is invoked for the methods that returned the result code of RC2 to determine whether to delete the event. The operations shown in block 516 are discussed in detail in FIG. 6.

From block 516 control proceeds to block 518 in which the event deletion manager 108 determines whether the deletion decision may be made with more than K methods voting for the deletion. Control proceeds to block 520 where a determination is made as to whether the number of received RC0 codes (indicates a vote for deletion) exceed K. If so ("yes" branch 522), the event is deleted (at block 524) and the process ends (at block 526). If not ("no" branch 528) a determination is made (at block 530) as to whether the estimated decision time has been reached (i.e., the current time is the estimated decision time). If not ("no" branch 532) the event deletion manager 108 waits (at block 534) unit all result codes are returned and control proceeds to block 518.

If a determination is made that the estimated decision time has been reached ("yes" branch 536) then the event is not deleted (at block 528) because by that time the number of received RC0 codes (i.e., deletion votes) does not exceed K, and the process ends (at block 526).

Therefore, FIG. 5 illustrates how to confirm the deletion of an event based on the votes of a plurality of deletion methods, if necessary by relaxing the deletion criteria for a subset of deletion methods so that the votes of all deletion methods are counted.

Figure 6:
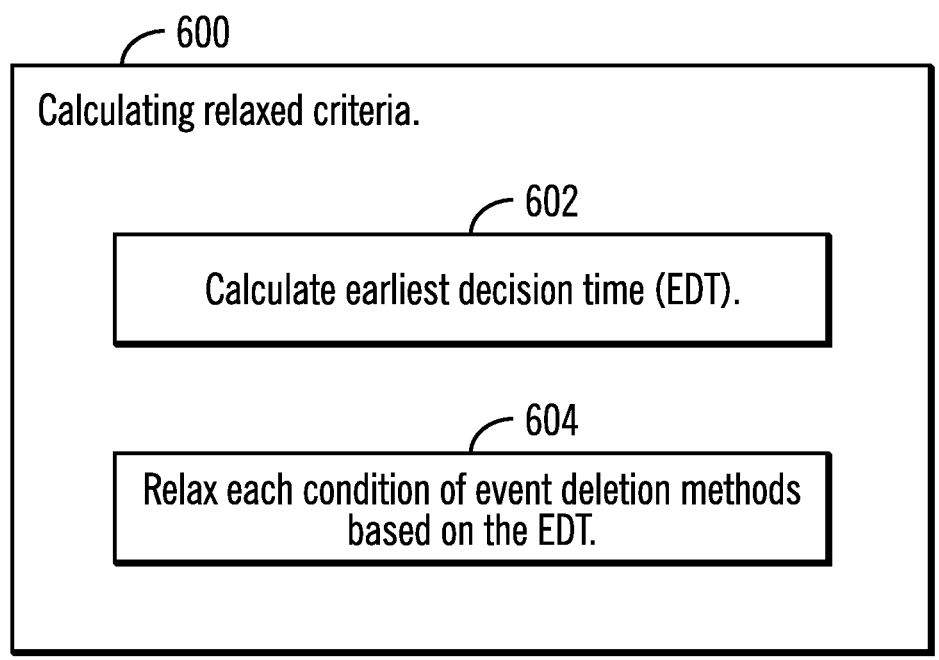
FIG. 6 illustrates a block diagram that shows exemplary calculations of a relaxed criteria (i.e., condition) for deletion of events, in accordance with certain embodiments.

FIG. 6 illustrates a flow chart 600 that shows exemplary calculations of a relaxed criteria (i.e., condition) for deletion of events, in accordance with certain embodiments. The relaxing of criteria may be done by various mechanisms, and certain exemplary mechanisms are shown in FIG. 6.

In calculating the earliest decision time (EDT) (reference numeral 602) it is assumed that a method reports the notification of event deletion to the event deletion manager 108. For the other methods which return RC2 (i.e., cannot determine whether or not to delete the event), the event deletion manager 108 calculates a time at which the method can make a decision. In case of Type-1 events (events generated by declaration 304), the time is derived from "time condition" information from a rule engine. In case of Type-2 events (events generated by delegation 306), the time is derived from a location of the closest vehicle that the delegation is requested to. From its distance and velocity, the method can calculate the approximate earliest time. In case of Type-3 events (event generated by time decay model 308), the time is derived from the time decay model. It should be noted that the EDT may be configured without the steps above, in case that the decision time is fixed (e.g. 5 minutes from the report).

Relaxing for each condition of event deletion methods based on the EDT is performed (reference numeral 604) by comparing each decision time of a method which returns RC2, with the EDT determined in the previous operation and a ratio (r) is calculated of how early the decision time became by comparing the EDT to the original decision time. The ratio (r) is reflected to the condition of event deletion.

For example, in case of Type-1 deletions 316, a new threshold of the ABS count is calculated by multiplying the ratio. For example, if the time condition is changed from 15 minutes to 5 minutes by EDT, the ratio r is 0.3 and the ABS count is changed from 3 to 1. In case of Type-2 deletions 320, a notification area is changed from one directed link to multiple directed links connecting the event. Ratio r is used for setting the area (e.g., the radius of notification area is multiplied by 1/r). In case of Type-3 deletions 322, the new threshold is derived from a value at EDT on the time decay model.

In certain embodiments, the event deletion manager 108 selects the earliest time for calculating the condition of the relaxation because if it is not the earliest, the condition becomes more severe than the original condition. In case EDT is fixed (e.g., 5 minutes) and it is not earlier than a compared decision time, then relaxation is not carried out and the original condition is maintained.

Figure 7:
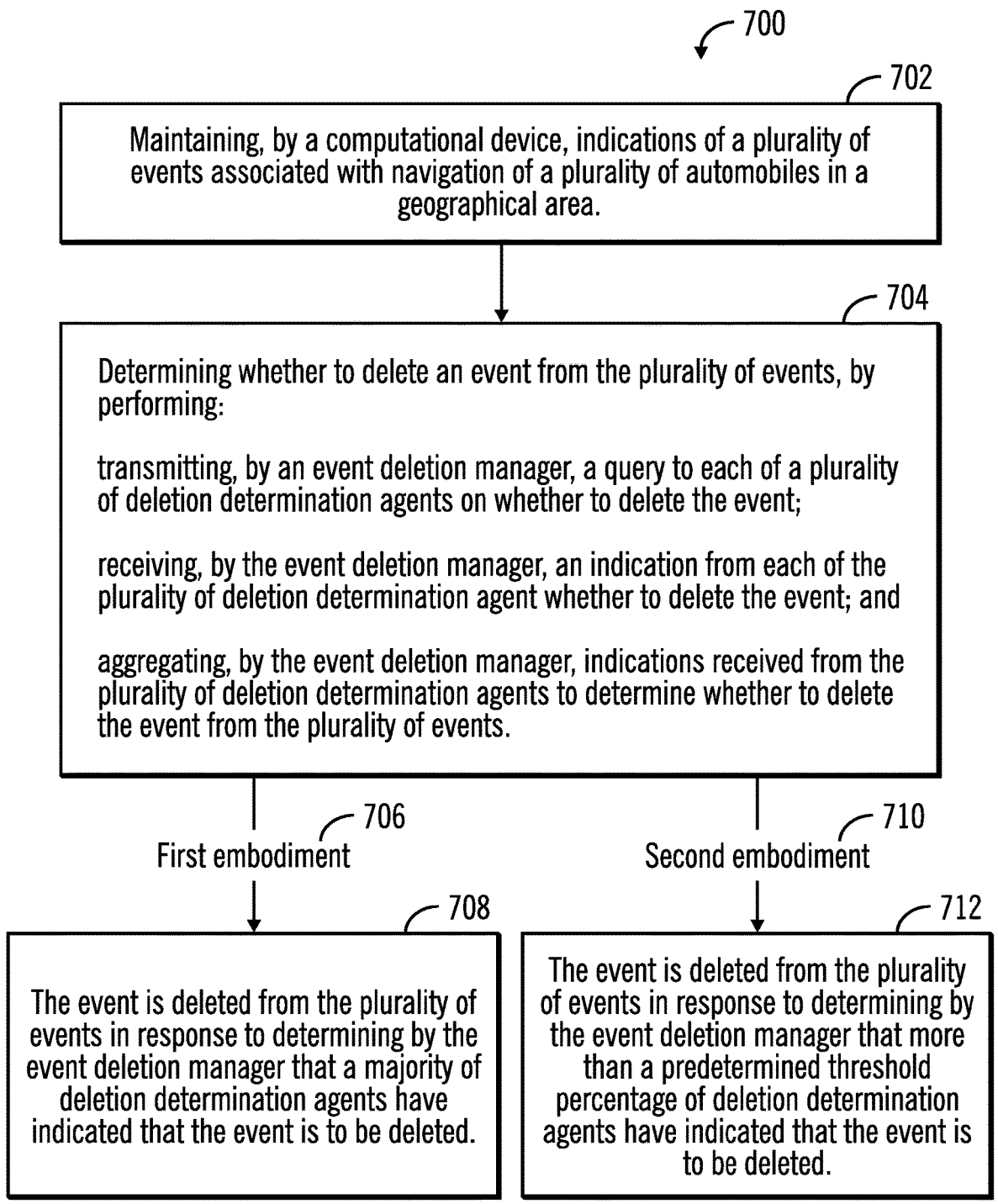
FIG. 7 illustrates a flowchart that shows how events are deleted, in accordance with certain embodiments.

FIG. 7 illustrates a flowchart 700 that shows how events are deleted, in accordance with certain embodiments. In certain embodiments the operations shown in FIG. 7 may be performed by the event deletion manager 108 that executes in the computational device 102.

Control starts at block 702 in which a computational device 102 maintains indications of a plurality of events associated with navigation of a plurality of vehicles in a geographical area. A determination is made (at block 704) as to whether to delete an event from the plurality of events, by performing: transmitting, by an event deletion manager 108, a query to each (or some) of a plurality of deletion determination agents 110, 112 on whether to delete the event; receiving, by the event deletion manager 108, an indication from each (or some) of the plurality of deletion determination agents 110, 112 whether to delete the event; and aggregating, by the event deletion manager 108, indications received from the plurality of deletion determination agents 110, 112 to determine whether to delete the event.

In certain embodiments (e.g. first embodiment 706), the event is deleted from the plurality of events in response to determining by the event deletion manager 108 that a majority of deletion determination agents have indicated that the event is to be deleted (at block 708). As a result, a majority voting based scheme is used to determine whether to delete events.

In further embodiments (e.g. second embodiment 710), the event is deleted from the plurality of events in response to determining by the event deletion manager 108 that more than a predetermined threshold percentage of deletion determination agents have indicated that the event is to be deleted (at block 712). As a result, for certain critical events (e.g., events that have a high chance of causing accidents) a supermajority approval may be needed to delete events.

Figure 8:
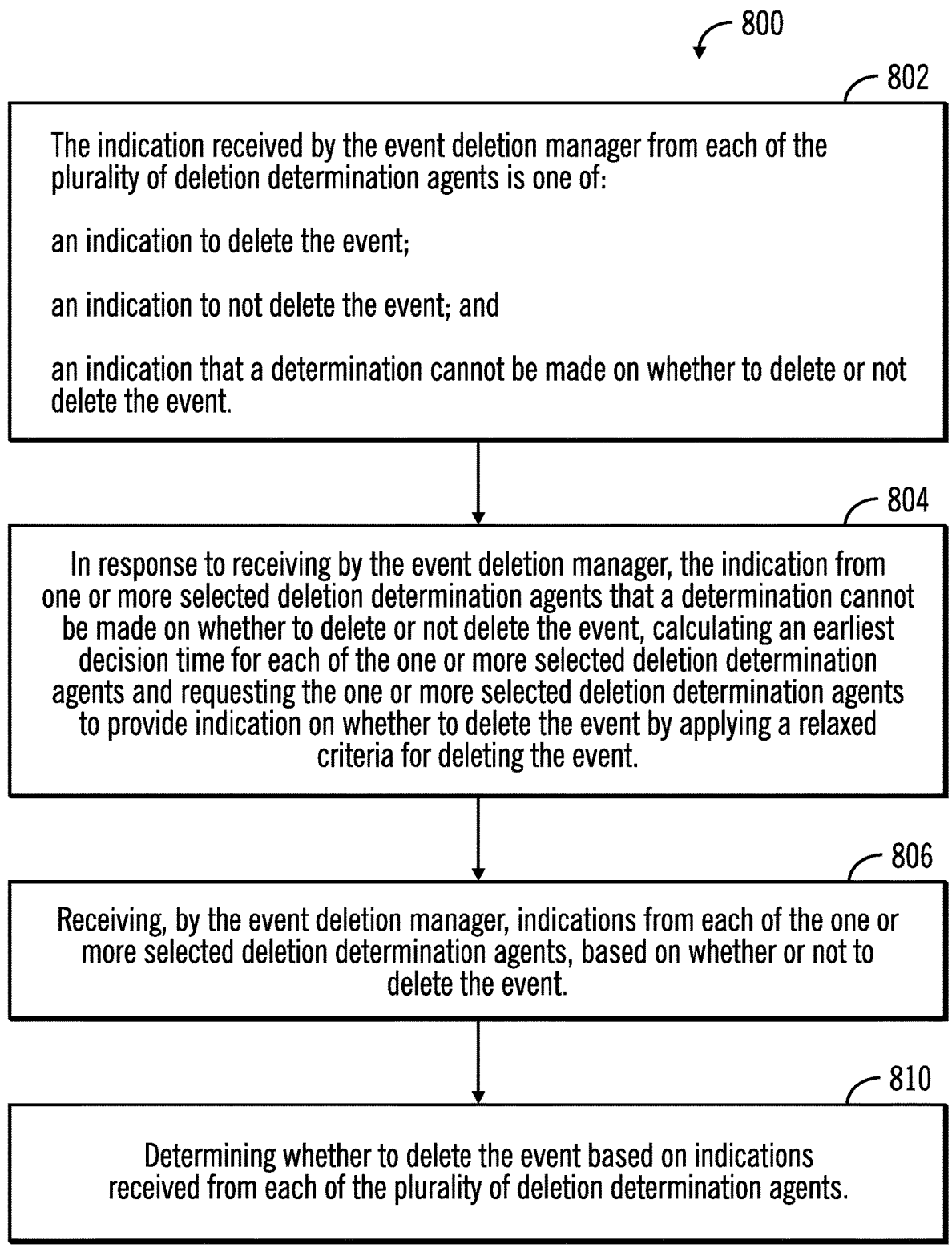
FIG. 8 illustrates a flowchart that shows how events are deleted based on a relaxed criteria, in accordance with certain embodiments.

FIG. 8 illustrates a flowchart 800 that shows how events are deleted based on a relaxed criteria, in accordance with certain embodiments. In certain embodiments the operations shown in FIG. 8 may be performed by the event deletion manager 108 that executes in the computational device 102.

Control starts at block 802 in which, the indication received by the event deletion manager 108 from each (or some) of the plurality of deletion determination agents 110, 112 is one of: an indication to delete the event; an indication to not delete the event; and an indication that a determination cannot be made on whether to delete or not delete the event. As a result, the event deletion manager may determine which of the deletion determination agents need more time to determine whether or not to delete the event.

Control proceeds to block 804, in which response to receiving by the event deletion manager 108, the indication from one or more selected deletion determination agents that a determination cannot be made on whether to delete or not delete the event, the event deletion manager 108 calculates an earliest decision time for each (or some) of the one or more selected deletion determination agents and requests the one or more selected deletion determination agents to provide indication on whether to delete the event by applying a relaxed criteria for deleting the event. As a result, a limited amount of additional time is provided to certain deletion determination agent to determine whether or not a delete the event based on a relaxed deletion criteria, wherein the relaxed criteria makes it more likely to indicate deletion of events in comparison to a previously applied criteria.

The event deletion manager 108 receives (at block 806) indications from each (or some) of the one or more selected deletion determination agents 110, 112 based on the relaxed criteria whether or not to delete the event. A determination is made (at block 810) as to whether to delete the event based on indications received from each (or some) of the plurality of deletion determination agents.

Therefore FIGS. 1-8 illustrate embodiments in which events are deleted based on the votes of a plurality of deletion determination agents, wherein to facilitate the voting conditions for indicating whether or not to delete events may be made less stringent for a subset of the deletion determination agents. As far as possible, all eligible deletion determination agents are made to vote and a majority or supermajority of the votes are used to delete events.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
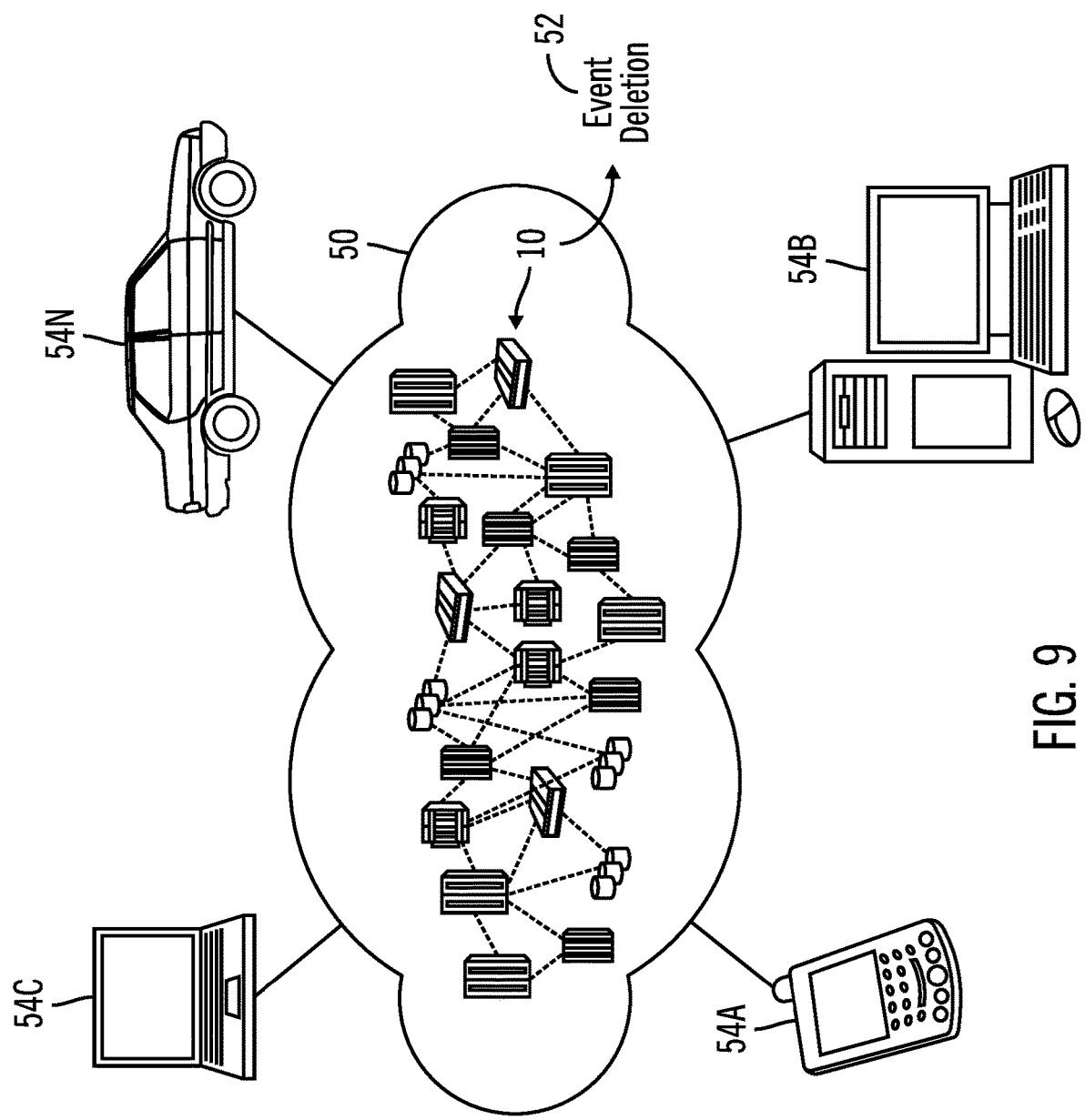
FIG. 9 illustrates a block diagram of a cloud computing environment, in accordance with certain embodiments.

Referring now to FIG. 9 an illustrative cloud computing environment 50 is depicted. Event deletion (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
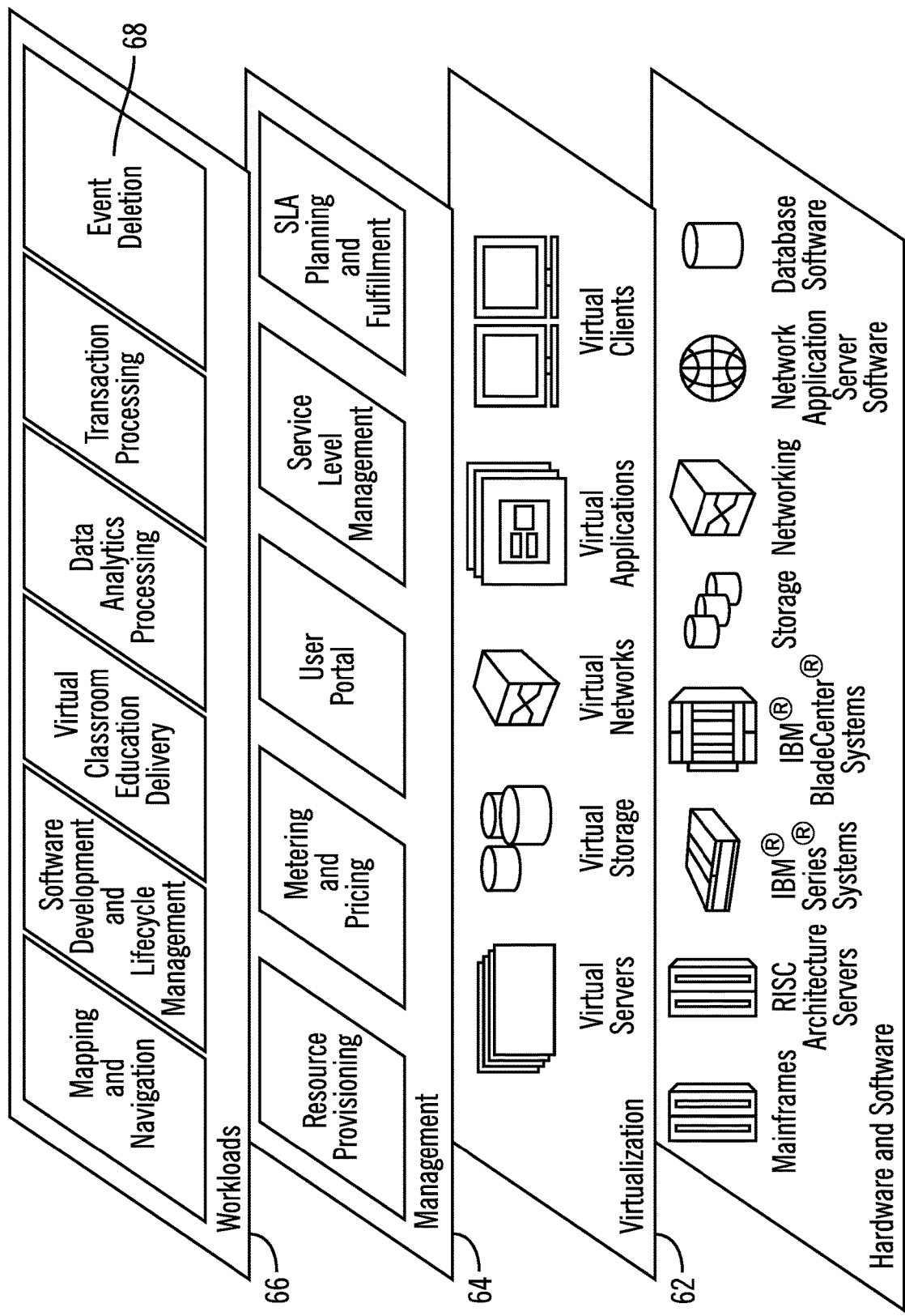
FIG. 10 illustrates a block diagram of further details of the cloud computing environment of FIG. 9 in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and migrate and event deletion 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
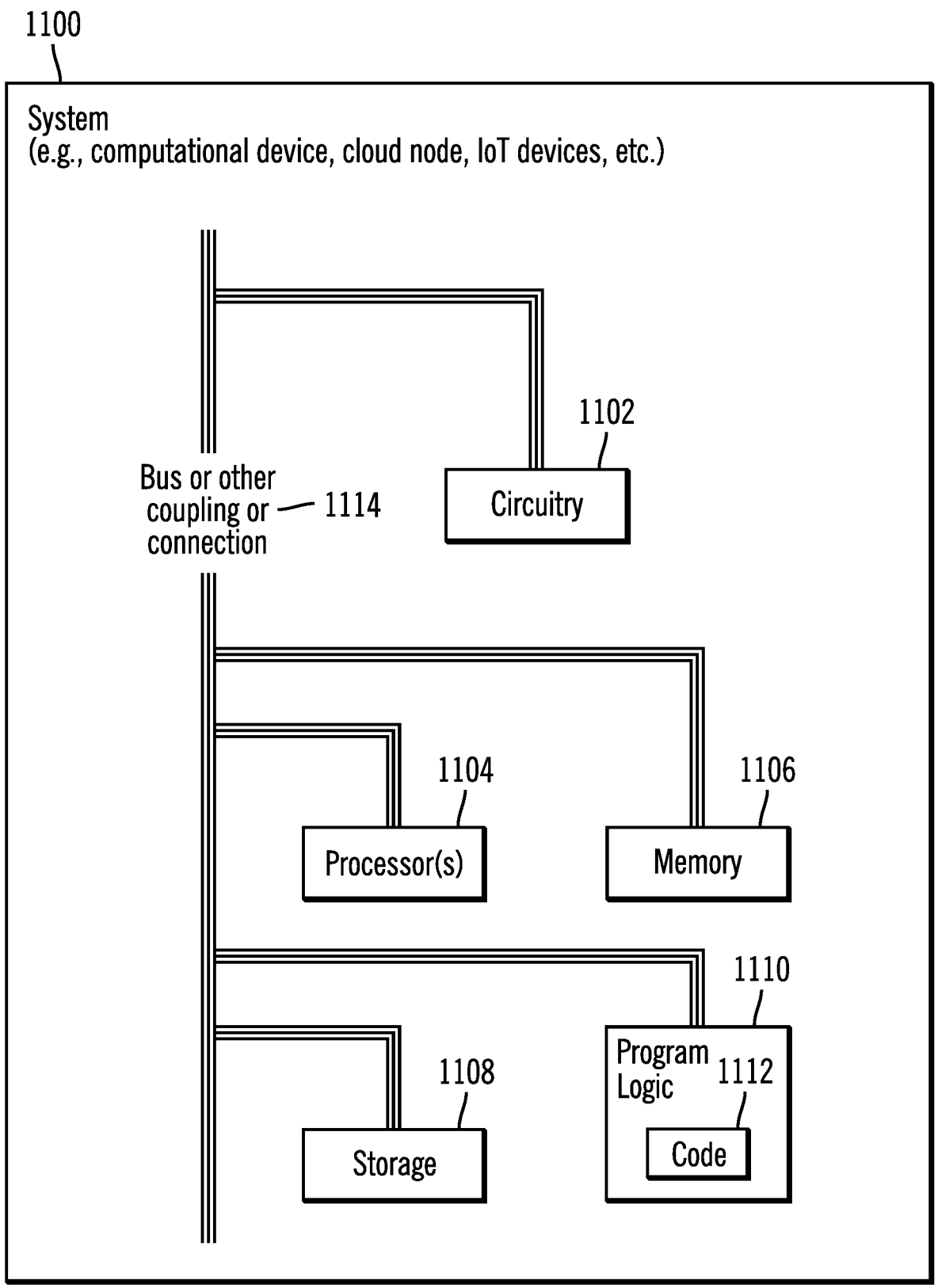
FIG. 11 illustrates a block diagram of a computational system that shows certain elements that may be included in the computational device or cars or other IoT devices, as described in FIGS. 1-10, in accordance with certain embodiments.

FIG. 11 illustrates a block diagram that shows certain elements that may be included in the computational device 102 or vehicles 104, 106 or other IoT devices, in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. While FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* IBM, ZSERIES, PSERIES, XSERIES, BLADECENTER, WEBSPHERE, DB2 are trademarks or registered trademarks of International Business Machines Corporation registered in many jurisdictions worldwide.

What is claimed is:

1. A method, comprising:
    maintaining, by a computational device, indications of a plurality of events associated with navigation of a plurality of vehicles in a geographical area, wherein a plurality of deletion determination agents execute in the computational device;
    in response to receiving by an event deletion manager, an indication from one or more selected deletion determination agents that a determination cannot be made on whether to delete or not delete an event, calculating an earliest decision time for the one or more selected deletion determination agents and requesting the one or more selected deletion determination agents to provide indication on whether to delete the event by applying a relaxed criteria for deleting the event, wherein the indication received by the event deletion manager is one of: an indication to delete the event; an indication to not delete the event; and an indication that the determination cannot be made on whether to delete or not delete the event, and wherein the relaxed criteria makes it more likely to allow determination of whether to indicate deletion of events in comparison to a previously applied criteria; and
    deleting another event from the plurality of events, in response to determining by the event deletion manager that a majority of the plurality of deletion determination agents that execute in the computational device have indicated, via an indication in response to a query by the event deletion manager, that the another event is to be deleted.

2. The method of claim 1, the method further comprising:
    receiving, by the event deletion manager, indications from the one or more selected deletion determination agents based on the relaxed criteria, on whether or not to delete the event; and
    determining whether to delete the event based on indications received from the one or more selected deletion determination agents.

3. A system, comprising:
    a memory; and
    a processor coupled to the memory, wherein the processor performs operations, the operations comprising:
        maintaining indications of a plurality of events associated with navigation of a plurality of vehicles in a geographical area, wherein a plurality of deletion determination agents execute in the system;
        in response to receiving by an event deletion manager, an indication from one or more selected deletion determination agents that a determination cannot be made on whether to delete or not delete an event, calculating an earliest decision time for the one or more selected deletion determination agents and requesting the one or more selected deletion determination agents to provide indication on whether to delete the event by applying a relaxed criteria for deleting the event, wherein the indication received by the event deletion manager is one of: an indication to delete the event; an indication to not delete the event; and an indication that the determination cannot be made on whether to delete or not delete the event, and wherein the relaxed criteria makes it more likely to allow determination of whether to indicate deletion of events in comparison to a previously applied criteria; and deleting another event from the plurality of events, in response to determining by the event deletion manager that a majority of the plurality of deletion determination agents that execute in the computational device have indicated, via an indication in response to a query by the event deletion manager, that the another event is to be deleted.

4. The system of claim 3, the operations further comprising:

receiving, by the event deletion manager, indications from the one or more selected deletion determination agents based on the relaxed criteria, on whether or not to delete the event; and determining whether to delete the event based on indications received from the one or more selected deletion determination agents.

5. A computer program product, the computer program product comprising a computer readable storage medium having computer readable program code embodied therewith, the computer readable program code configured to perform operations, the operations comprising:

maintaining, by a computational device, indications of a plurality of events associated with navigation of a plurality of vehicles in a geographical area, wherein a plurality of deletion determination agents execute in the computational device;

in response to receiving by an event deletion manager, an indication from one or more selected deletion determination agents that a determination cannot be made on whether to delete or not delete an event, calculating an earliest decision time for the one or more selected deletion determination agents and requesting the one or more selected deletion determination agents to provide indication on whether to delete the event by applying a relaxed criteria for deleting the event, wherein the indication received by the event deletion manager is one of: an indication to delete the event; an indication to not delete the event; and an indication that the determination cannot be made on whether to delete or not delete the event, and wherein the relaxed criteria makes it more likely to allow determination of whether to indicate deletion of events in comparison to a previously applied criteria; and deleting another event from the plurality of events, in response to determining by the event deletion manager that a majority of the plurality of deletion determination agents that execute in the computational device have indicated, via an indication in response to a query by the event deletion manager, that the another event is to be deleted.

6. The computer program product of claim 5, the operations further comprising:

receiving, by the event deletion manager, indications from the one or more selected deletion determination agents based on the relaxed criteria, on whether or not to delete the event; and determining whether to delete the event based on indications received from the one or more selected deletion determination agents.

7. A single computational device including a processor, wherein the single computational device is communicatively coupled to a plurality of vehicles, wherein the single computational device performs operations, the operations comprising:

maintaining, by the single computational device, indications of a plurality of events associated with navigation of the plurality of vehicles in a geographical area, wherein a plurality of deletion determination agents execute in the single computational device;

in response to receiving by an event deletion manager, an indication from one or more selected deletion determination agents that a determination cannot be made on whether to delete or not delete an event, calculating an earliest decision time for the one or more selected deletion determination agents and requesting the one or more selected deletion determination agents to provide indication on whether to delete the event by applying a relaxed criteria for deleting the event, wherein the indication received by the event deletion manager is one of: an indication to delete the event; an indication to not delete the event; and an indication that the determination cannot be made on whether to delete or not delete the event, and wherein the relaxed criteria makes it more likely to allow determination of whether to indicate deletion of events in comparison to a previously applied criteria; and deleting another event from the plurality of events, in response to determining by the event deletion manager that a majority of the plurality of deletion determination agents that execute in the computational device have indicated, via an indication in response to a query by the event deletion manager, that the another event is to be deleted.

8. The single computational device of claim 7, the operations further comprising:

receiving, by the event deletion manager, indications from the one or more selected deletion determination agents based on the relaxed criteria, on whether or not to delete the event; and determining whether to delete the event based on indications received from the one or more selected deletion determination agents.

* * * * *